United States Patent [19]

Ljøsne

[11] Patent Number: 5,642,793

[45] Date of Patent: Jul. 1, 1997

[54] INDICATOR DEVICE FOR SIGNALLING THAT THE WEAR LIMIT HAS BEEN REACHED FOR SERVO-OPERATED CLUTCHES

[75] Inventor: Knut Tore Ljøsne, Kongsberg, Norway

[73] Assignee: Kongsberg Automotive AS, Norway

[21] Appl. No.: 448,558

[22] PCT Filed: Dec. 20, 1993

[86] PCT No.: PCT/NO93/00195

§ 371 Date: Jun. 7, 1995

§ 102(e) Date: Jun. 7, 1995

[87] PCT Pub. No.: WO94/15111

PCT Pub. Date: Jul. 7, 1994

[30] Foreign Application Priority Data

Dec. 21, 1992 [NO] Norway ..................... 92 4957

[51] Int. Cl.[6] .................................................. F16D 66/02
[52] U.S. Cl. .......................... 192/30 W; 192/85 R; 92/5 R; 116/277; 188/1.11
[58] Field of Search ................... 192/30 W, 85 R; 92/5 R; 188/1.11 W; 116/277, DIG. 7

[56] References Cited

U.S. PATENT DOCUMENTS 3,406,800  10/1968  Buchanan et al. ............. 192/30 W
4,084,671  4/1978   Ternehall .................... 192/30 W

FOREIGN PATENT DOCUMENTS 1159596  7/1969   United Kingdom .
2 076 101  11/1981  United Kingdom .

Primary Examiner—Andrea L. Pitts
Attorney, Agent, or Firm—Finnegan, Henderson, Farabow, Garrett & Dunner

[57] ABSTRACT

An indicator device for signalling that the wear limit has been reached for servo-operated clutches, particularly for motor vehicles. A servo housing comprises a servo piston, which can be moved forward and backward therein for disengaging and engaging the clutch respectively, and the servo piston's rest position, i.e. the position in which it is located when the clutch is engaged, in the event of an increase in clutch wear is gradually moved towards the rear end wall of the housing. The servo housing further comprises a control valve which controls the supply of pressurized fluid to a cylinder space which is located between the servo piston and the rear end wall. An indicator comprises a through-going bore provided in the end wall, which bore extends in the piston's direction of movement, and a slide valve positioned in the bore which can be moved between a first position, wherein the front end of the slide valve projects into the cylinder space, and a second position wherein the slide valve is shifted rearward of the servo piston in relation to the first position. The bore has a front section and a rear section whose diameter is greater than the diameter of the front section, and the slide valve has a rear section and a front section whose diameter is adapted to the diameter of the front bore section. The front slide valve section at its rear has a packing which sealingly abuts against the front bore wall when the slide valve is located in the first position, and a return channel extends from the rear bore section near the front bore section to a return reservoir for the pressurized fluid.

8 Claims, 1 Drawing Sheet

5,642,793

INDICATOR DEVICE FOR SIGNALLING THAT THE WEAR LIMIT HAS BEEN REACHED FOR SERVO-OPERATED CLUTCHES

BACKGROUND OF THE INVENTION

The present invention relates to an indicator of the said type warns the user when the clutch has become worn to such an extent that there is a risk that the servo piston will come into contact with the rear end wall of the servo housing, thus avoiding that the clutch is not completely engaged. An indicator of this type is known, e.g., from U.S. Pat. No. 4,084,671. The indicator described therein provides a connection between the cylinder space and the atmosphere when it is actuated. The pressure in the cylinder space is Thereby lowered, the servo effect thus being reduced and the clutch pedal becoming correspondingly heavy to operate. This indicator, however, causes a major leakage of air, which is undesirable, since such a leakage also affects other user systems.

Furthermore it is known that a separate choke valve can be provided the air supply line to the servo unit, but the installation of such choke valve is expensive.

The object of the device according to the invention is to provide an indicator device of the known type, which is not encumbered by the above-mentioned disadvantages.

The characteristics of the device according to the invention are characterized by the features in the claims presented.

BRIEF DESCRIPTION OF THE DRAWINGS

The invention will now be described in more detail with reference to the drawing which illustrates an embodiment of a device according to the invention.

Figure 1:
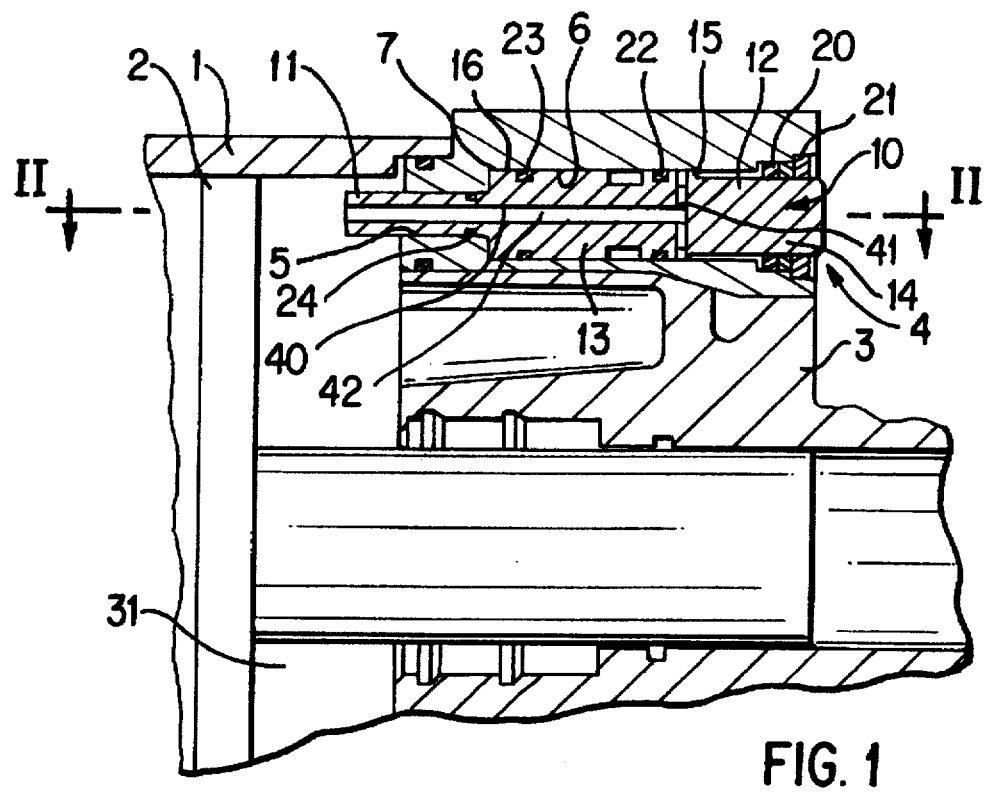
FIG. 1 is a vertical section through a servo unit with an indicator according to the invention.

The terms "forward" and "backward" will hereinafter refer to the directions to the left and right of the figures respectively. Correspondingly the terms "front" and "rear" will refer to relative positions in this respect.

DESCRIPTION OF THE PREFERRED EMBODIMENTS

As illustrated in the figures there is provided in the servo housing 1 a servo piston 2 which can be moved towards and away from a rear end wall 3 of the housing.

In a boring 4 which is provided in the end wall 3, and which extends parallel to the direction of movement of the servo piston 2, there is slidably provided a slide valve 10. The boring 4 has a front section 5 and a rear section 6 whose diameter is greater than the diameter of the front section 5, and the slide valve 10 has a front section 1 whose diameter is adapted to the diameter of the boring's front section 5, and a rear section 12 whose diameter over a large part of the length of the section 12 is adapted to the diameter of the boring's rear section 6.

The rear slide valve section 12 has a front area 13 and a rear area 14 whose diameter is reduced in relation to the diameter of the front area 13, in such a manner that between these areas there is formed a radially extending, annular shoulder or surface section 15 of the slide valve. The area of this annular surface section 15 is greater than the area of the transverse end surface of the slide valve's front end section 11.

Behind the rear section 6 of the boring 4 there is a portion having a greater diameter than the rear section 6 and being adapted to receive a rear packing 20 which sealingly abuts against the rear area 14 of the slide valve 10, and which at the rear is supported by a securing ring 21, which is inserted in a groove in the servo housing 1 thus preventing the packing 20 from being moved backward.

The slide valve can thus be moved between a first position where the step 16 which is formed between the front and the rear slide valve sections 11 and 12, respectively, abut%against the step 7 which is formed between the front and the rear sections 5 and 6 respectively of the boring 4, and a second position where the surface 15 abuts against the rear packing 20.

Near the rear slide valve area 14 there is provided on the front slide valve section 11 a front packing 24 which is arranged to abut sealingly against the front boring section 5. In front of this packing there is located between the front slide valve section and the front boring section a clearance through which air can pass.

Immediately in front of the surface section 15 the slide valve carries a rear central packing 22 which abuts sealingly against the rear boring section 6.

The rear slide valve area 14, the rear packing 20, the rear boring section 6 and the rear central packing 22 define a circular pressure chamber 30.

Between the servo piston 2 and the end wall 3 there is defined a servo cylinder space 31.

Figure 2:
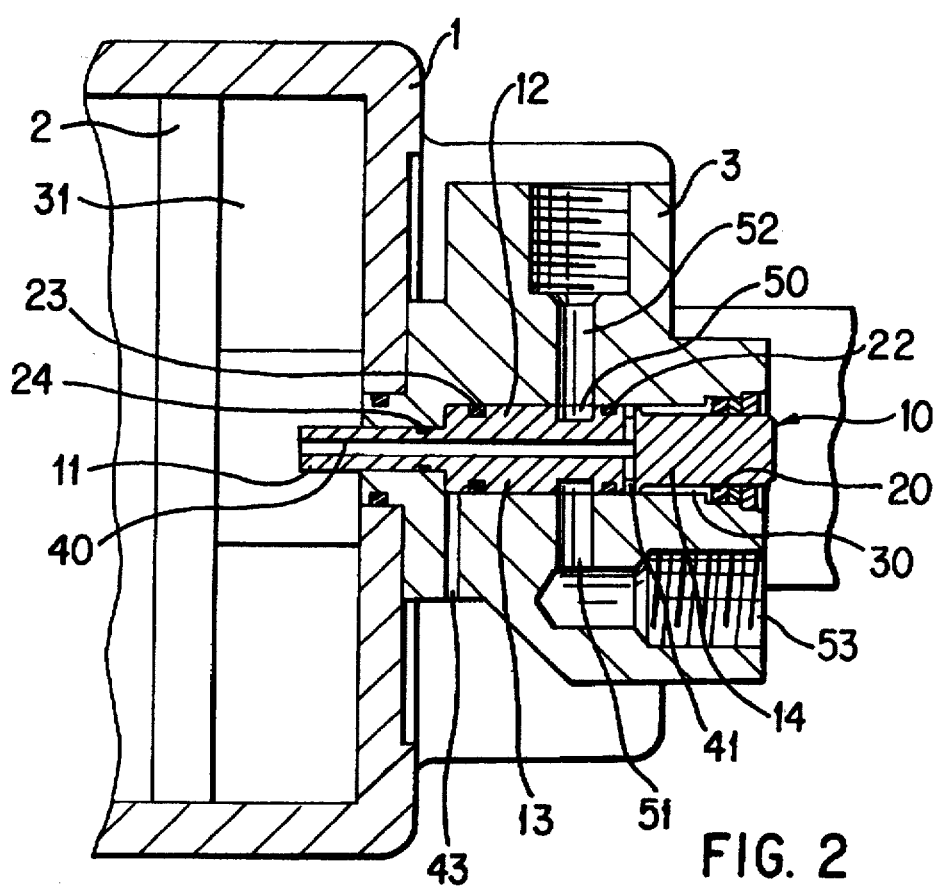
FIG. 2 shows a section along the line II—II in FIG. 1.

Since the volume of the space between the slide valve and the boring which is defined by the front packing 24 and the rear central packing 22 is altered when the slide valve is shifted, there is provided in the slide valve for pressure equalization a radially extending channel 43 from the rear boring section 6, e.g. immediately behind the step 7 as illustrated in FIG. 2, this channel being capable of communicating with the return reservoir for the pressure fluid, i.e. The atmosphere if compressed air is used.

In the slide valve 10 there is provided a channel 40 which comprises a radial section 41 which extends from approximately near the slide valve's central axis to the surface of the rear slide valve area 14 immediately behind the rear central packing, and an axial section 42 which extends from the front end of the slide valve to the radial section 41.

The method of operation of this first, embodiment of the indicator device is as follows.

When the compressed air is passed to the cylinder space 31, the pressure will be transmitted in the channel 40 to the pressure chamber 30. Since the area of the annular surface 15 is greater than the front end surface of the slide valve, the compressed air will exert a resulting, forward directed force against the slide valve 10, thereby pushing it forward toward its first position where the steps 16 and 7 abut against each other.

If the clutch becomes worn, the servo piston's rest position will be gradually shifted backward. When the clutch is engaged after its wear limit has been reached and the servo piston thereafter returned to its rest position, the servo piston will touch the front end of the slide valve and shift it backward to such an extent that the front packing 24 is brought into the rear section 6 of the boring 4. Thus when the clutch is operated, the pressure of the compressed air in the cylinder space can also be transmitted to the area in front of the rear central packing 22. Since the surface of the slide valve which is located in front of the rear central packing is larger then the annular surface 15, a resulting pressure force will now be exerted backward against the slide valve, thus causing the slide valve to be forcibly moved backward to its second position, i.e. until the surface section 15 abuts against the rear packing 20.

That section of the slide valve which projects out of the servo housing constitutes a warning that the clutch has exceeded its wear limit.

Before this limit was reached the slide valve was pneumatically retained securely against its first position, and after the limit was reached, to begin with the slide valve was first moved mechanically for a very short distance and thereafter moved pneumatically to its warning position and maintained there pneumatically.

After the installation of new clutch discs, the indicator can be quite easily brought into its initial position by shifting the slide valve forward, whereafter it will be kept in this position pneumatically and automatically until the wear limit is exceeded once again. There is no need for any replacement of deformed components or the like, which means that the device is simple and inexpensive in operation.

This above-described device, however, substantially only gives the mechanics an indication of clutch wear.

If it is desirable to also give the vehicle's driver such an indication, the diameter of the channel 43 can be larger than that which is necessary only for pressure equalization, the leakage channel 43 thus causing the pressure in the cylinder space to be substantially reduced when the wear limit is reached and the slide valve 10 is shifted backward by the servo piston, thus causing the cylinder space to communicate with the return reservoir.

In this case the vehicle's driver will have to exert considerably greater force against the clutch pedal than before in order to keep the clutch disengaged.

If it is also desirable that disengaging the clutch should be a heavier operation, the slide valve 10 can carry at the front end of its rear section 12 a front central packing 23, and immediately in front of the rear central packing 22 the slide valve 10 can have a narrowed section 50. Furthermore in the end wall 3 there can be provided two channels 51, 52 which extend radially in towards the slide valve's longitudinal axis at the same axial position in relation to the boring's rear section 6, and which communicate with each other via the narrowed section of the slide valve when it is located in its front position. One channel 51 communicates with a connection opening 53 for the supply of pressure fluid, and the second channel 52 communicates with the regulator (not shown) which controls the supply of pressure fluid to the cylinder space depending on the force which is exerted against the clutch pedal. It is this embodiment of the indicator device which is fully illustrated in the drawing.

If the wear limit for the clutch is not exceeded, compressed air from the compressed air connection 53 will flow unimpeded to the regulator and from there to the cylinder space 31.

When the wear limit is reached and the slide valve moved forcibly to its second position, the slide valve will cause a choking of the pressure fluid supply to the regulator. The disengagement of clutch will thereby feel heavier to the vehicle's driver.

In this connection the device can be designed in such a manner that the narrowed section is not in alignment with the supply channel 51 and the regulator channel 52 when the slide valve is located in its second position, these channels then communicating only via the small opening which in every case exists between these parts due to the difference in diameter between the slide valve and the boring. Alternatively can the narrowed section 50 and the channels 51 and 52 in the second position of the slide valve still overlap one another without being in complete alignment.

I claim:

1. An indicator device for signalling that the wear limit has been reached for a servo-operated clutch having a servo piston and a servo housing, the servo piston designed to reciprocate in the servo housing for disengaging and engaging the clutch; the servo housing having a rear end wall, a cylinder space located between the servo piston and the rear end wall, and a control for controlling the supply of a pressurized fluid to the cylinder space; the servo piston having a rest position in which it is located when the clutch is engaged, an increase in clutch wear causing the rest position of the servo piston to gradually move towards the rear end wall of the housing; and wherein the indicator comprises a through-going bore provided in the end wall, which bore extends in the piston's direction of movement, a slide valve slidable in the bore and movable between a first position, wherein the front end of the slide valve projects into the cylinder space, and a second position wherein the slide valve is shifted rearward of the servo piston in relation to the first position, the bore having a front bore section of a first diameter and a rear bore section of a second diameter greater than the first diameter of the front bore section, the slide valve having a rear valve section and a front valve section having a diameter approximate that of the diameter of the contiguous front bore section, the front valve section near the rear valve section containing a front packing which sealingly abuts against the inside of the front bore section when the slide valve is located in the first position, a return channel extending outwardly from the rear bore section near the front bore section to a return reservoir for the pressurized fluid, the rear valve section having a diameter which generally over the entire length of the rear valve section approximates the diameter of the contiguous rear bore section, and at its rear having a reduced diameter such that the cross-sectional area of the thereby formed, radially extending, annular slide valve surface is larger than the cross-sectional area of the front valve section, the rear end of the rear bore section containing a rear packing which abuts sealingly against the rear valve section, and together with the slide valve and the servo housing define a pressure chamber, and a channel extending from the cylinder space to the pressure chamber.

2. A device according to claim 1, wherein the channel which extends from the cylinder space to the pressure chamber is provided in the slide valve, the channel extending from the front end of the slide valve to near its rear end, and having at least one radially extending channel section which terminates forward of but adjacent to the rear valve section of reduced diameter.

3. A device according to claim 1, wherein the channel which extends from the cylinder space to the pressure chamber is provided in the servo housing, terminal immediately in front of the rear packing.

4. A device according to any one of claims 1, 2, or 3, wherein the rear valve section has a central area of reduced diameter and in front of and rearward of this central area contains a front and a rear central packing, respectively, which abut sealingly against the inside of the rear bore section, the distance between the central area and the front central packing being greater than the distance travelled by the slide valve when it is moved from the first to the second position, and wherein the servo housing further comprises second and third channels which are connected to a pressurized fluid source and the control, respectively, and which are in alignment with the central area when the slide valve is located in its first position.

5. A device according to claim 4, wherein the diameters of the second and third channels and the length of the central area are substantially the same, measured in the slide valve's longitudinal direction.

6. A device according to claim 1, wherein the radially extending; annular slide valve surface constitutes a stop which abuts against the rear packing and determines the slide valve's second position.

7. A device according to claim 1, wherein the diameter of the return channel is so small that the pressure fluid which flows through it from the cylinder space to the return reservoir essentially does not cause such a reduction in the fluid pressure in the cylinder space that a distinctly perceptible increase in force has to be exerted against the clutch pedal in order to keep the clutch disengaged when the slide valve has been moved to its second position.

8. A device according to any one of claims 2, 3 or 1, wherein the diameter of the return channel is so large that the pressure fluid which flows through it from the cylinder space to the return reservoir causes such a great reduction in the fluid pressure in the cylinder space that a distinctly perceptible and substantial increase in force has to be exerted against the clutch pedal in order to keep the clutch disengaged when the slide valve has been moved to its second position.

* * * * *

UNITED STATES PATENT AND TRADEMARK OFFICE
CERTIFICATE OF CORRECTION

PATENT NO. : 5,642,793
DATED : July 1, 1997
INVENTOR(S) : Knute Tore Ljøsne

It is certified that error appears in the above-indentified patent and that said Letters Patent is hereby corrected as shown below:

Claim 3, col. 4, line 56, "terminal" should read --terminating--.

Claim 6, col. 5, line 9, "extending;" should read --extending,--.

Claim 8, col. 6, line 8, delete "great".

Signed and Sealed this

Second Day of September, 1997

*Attest:*

BRUCE LEHMAN

*Attesting Officer*   Commissioner of Patents and Trademarks